INVENTOR
SOTIRIS KITRILAKIS

INVENTOR
SOTIRIS KITRILAKIS

July 7, 1970  S. S. KITRILAKIS  3,519,065

GAS HEATING AND COOLING SYSTEM

Filed Oct. 4, 1968  3 Sheets-Sheet 3

INVENTOR
SOTIRIS S. KITRILAKIS
BY Kenway, Jenney & Hildreth
ATTORNEYS

United States Patent Office 3,519,065
Patented July 7, 1970

3,519,065
GAS HEATING AND COOLING SYSTEM
Sotiris S. Kitrilakis, Newtonville, Mass., assignor to Thermo Electron Corporation, Waltham, Mass., a corporation of Delaware
Filed Oct. 4, 1968, Ser. No. 765,207
Int. Cl. F25b *29/00*
U.S. Cl. 165—26                                        7 Claims

ABSTRACT OF THE DISCLOSURE

A gas fired temperature control unit for air conditioning and heating, comprising two interconnected units, one adapted to be mounted outside and one inside the space to be heated or cooled. The outside unit comprises a hermetically sealed housing in which there is a five-stage fluid processing system comprising a compressor, a Rankine cycle engine, a feed pump, an electric motor, and a low pressure liquid pump. Located in a common ventilated housing with this hermetically sealed unit are a condenser, a boiler, a regenerator and a fluid reservoir. The inside unit comprises a heat exchanger which serves as an evaporator for air conditioning and as a condenser for heating. The inside and outside units are interconnected by valving under thermostatic control that connects the apparatus either as a heater or as an air conditioner in dependence on the temperature in the space to be controlled.

---

My invention relates to heat exchange systems, and particularly to a novel combination heating and cooling unit for year-round temperature control in mild climates.

For occupied buildings such as offices and residences, particularly in the moderate temperature zones, it is desirable to provide for both winter heating and summer cooling to maintain a comfortable year-round temperature. While it is entirely feasible to accomplish both functions, conventional apparatus for the purpose, involving in general a furnace installed in the basement, and an air conditioner installed in various locations, leaves much to be desired by way of initial cost, space required for the installation, and cost of operation. The objects of my invention are to reduce the size of air cooling and heating apparatus, while reducing the complexity of the apparatus and reducing the cost of operation.

Briefly, the above and other objects of my invention are attained by a novel air conditioning and heating system in which a common organic fluid is used for both the heating and cooling cycles, and in which the primary energy source is a gas-fired boiler. A single heat exchanger that serves for both heating and cooling is located in the space to be controlled, for example, in an air duct serving to circulate air through a dwelling while heating or cooling it. Fluid processing apparatus for exchanging fluid with this heat exchanger is located in a separate unit that is adapted to be mounted outside of the space to be controlled; for example, outdoors, or in the basement of a house. The fluid processing unit includes a gas-fired boiler in which the organic working fluid of the system is heated indirectly, through an intermediate fixed charge of water that serves as a thermal storage intermediate and prevents hot spots that would cause decomposition of the organic fluid.

For heating purposes, a low pressure liquid pump is provided that serves to move liquid from the inside heat exchanger to the boiler, where it is boiled and sent as heated vapor to the heat exchanger to be condensed and heat the air in the house. The low pressure feed pump is actuated in the heating cycle by an electric motor.

The low pressure pump and the electric motor are enclosed in a common housing with a Rankine cycle vapor engine, a high pressure feed pump for the engine that is driven by the engine, and a compressor that in accordance with my invention forms a part of the engine structure and shares a common crankcase. The electric motor serves as a starting motor for the Rankine cycle engine.

During the air conditioning cycle, the boiler is used to supply working fluid to the engine, to drive the high pressure feed pump and the compressor. Exhaust fluid from the engine is condensed in the outside condenser, whence a portion is returned to the engine via the engine feed pump and boiler, and another portion is supplied to the inside heat exchanger that now serves as an evaporator for air conditioning. Exhaust vapor from the evaporator is supplied to the compressor and returned to the condenser to complete the cooling fluid flow path.

Since the engine, the compressor, the high and low pressure feed pumps, and the electric motor are all hermetically sealed in a common housing, considerable simplification is possible. A common lubricating system can be provided, and no particular provision need be made for absolute prevention of leakage between the various elements. No positive seals are required between moving parts, and corrosion is inhibited because all spaces within the sealed system are filled either with saturated vapor or liquid comprising the organic working fluid, with air or other non-condensable or corrosive gases or liquids being excluded.

The apparatus of my invention, and its mode of operation, will best be understood in the light of the following detailed description, together with the accompanying drawings, of a preferred embodiment thereof.

Figure 1:
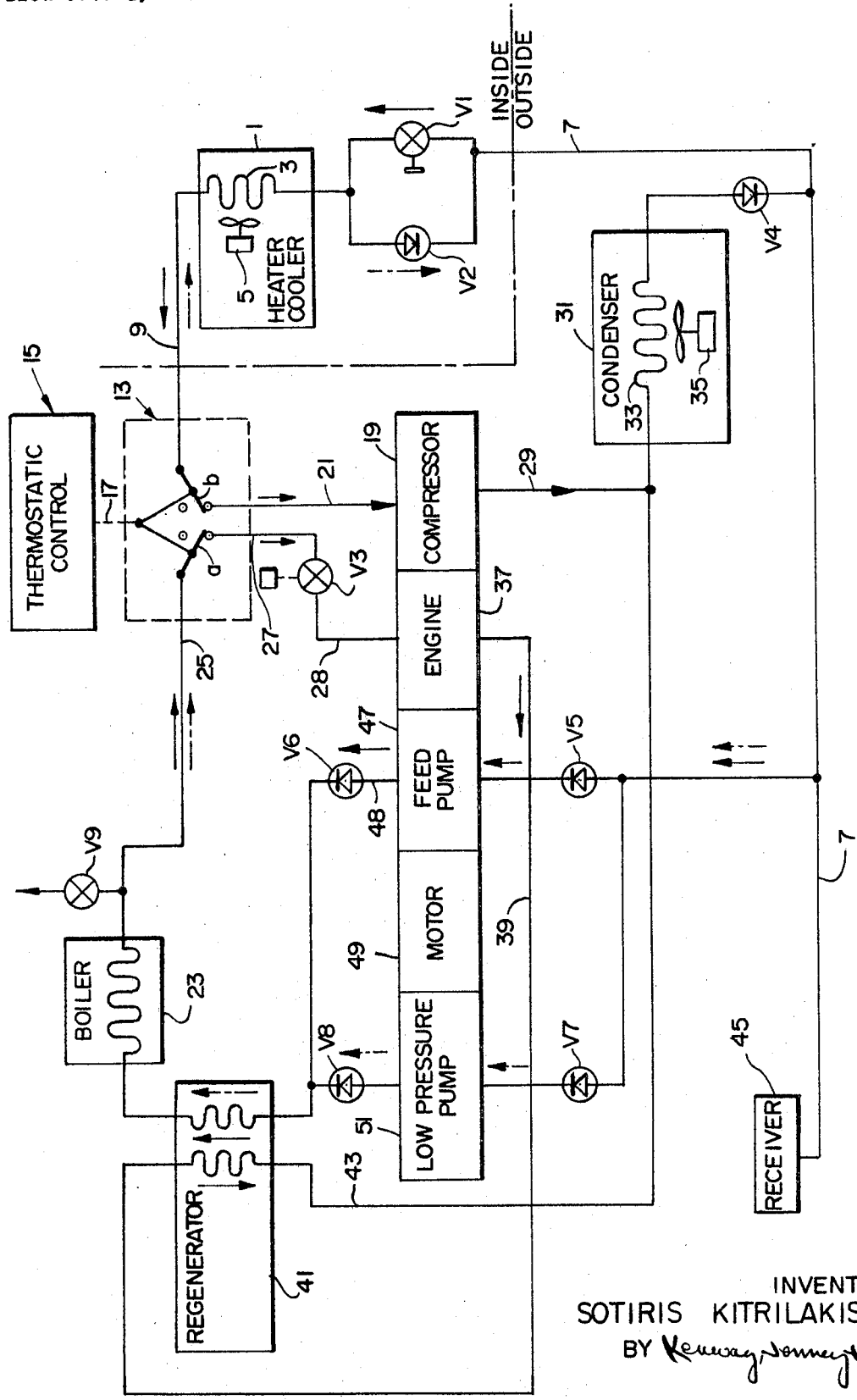
FIG. 1 is a schematic piping diagram and flow chart of the system of my invention.
Figure 2:
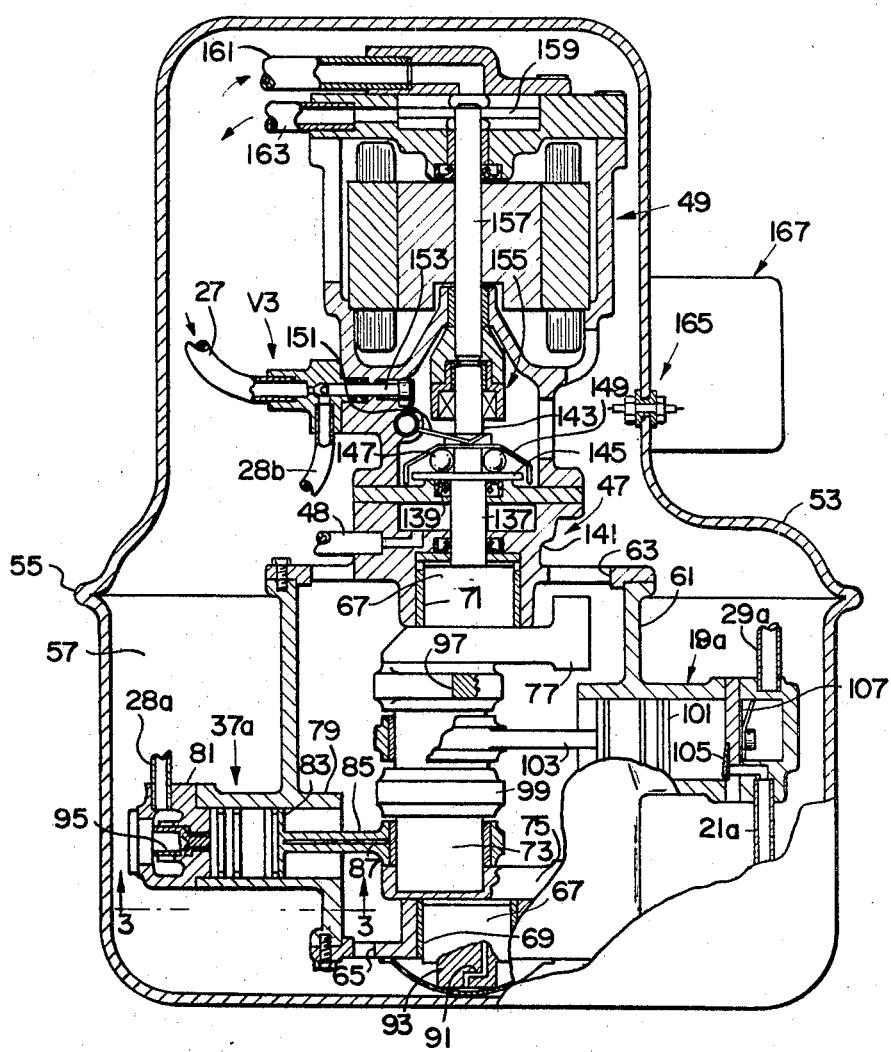
FIG. 2 is a schematic elevational view, with parts shown in cross-section and parts broken away, of a sealed fluid treatment unit forming a part of the apparatus of FIG. 1.
Figure 3:
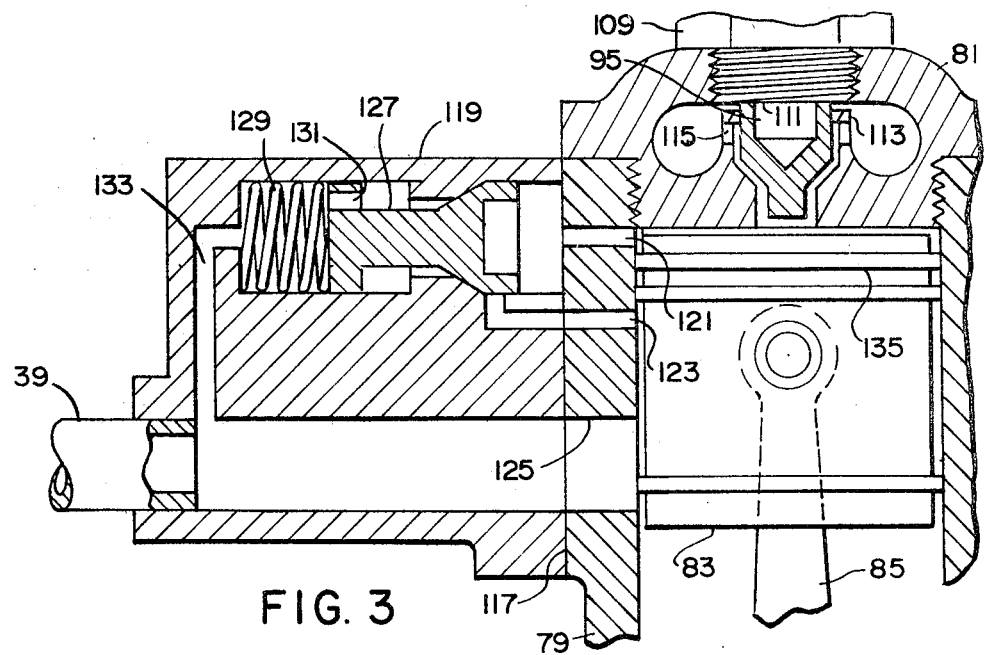
Figure 4:
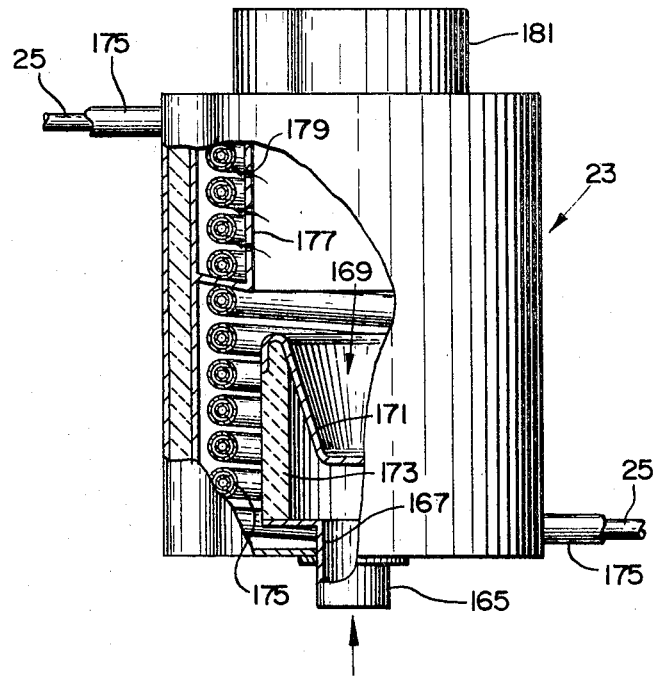

FIG. 3 is a fragmentary elevational view, with parts shown in cross-section and parts broken away, taken substantially along the lines 3—3 in FIG. 2 but on a larger scale, and illustrating the exhaust valve mechanism forming a part of the engine of my invention; and FIG. 4 is a diagrammatic elevational sketch, with parts shown in cross-section and parts broken away, of a boiler suitable for use in the apparatus of FIG. 1.

In FIG. 1, certain conventions have been adopted to simplify the illustration and description of the system. In the drawings, solid lines represent pipes or other fluid conduits, and valves are shown by conventional symbols to be explained. Solid arrows represent the flow of fluid during the cooling cycle of the apparatus, and dotted arrows represent the flow of fluid during the heating cycle.

As shown in FIG. 1, the portion of the system of my invention that is intended for installation inside the house to be heated comprises a heat exchanger 1 that is at times used as a condenser and at other times used as an evaporator. The heat exchanger 1 comprises a coil 3 of conventional finned heat exchanger tubing, and may be associated with a conventional blower schematically indicated at 5, actuated by an electric motor supplied with energy from a conventional 110 volt alternating current supply. The coil 3 and blower 5 may be installed in a suitable air duct for supplying either warm air or cool air for heating or cooling purposes.

The heat exchanger 1 is connected to a liquid line 7 by means of a conventional expansion valve V1, in parallel with a check valve V2. The expansion valve V1 may be of the conventional fixed orifice variety, or it may be a throttle valve controlled by downstream pressure or by the temperature in the heat exchanger 1 when the latter is used as an evaporator. When liquid flows through the check valve V2 in the direction shown by the dotted arrow, the valve V1 is effectively by-passed.

The heat exchanger 1 is also connected to a vapor line 9. The liquid line 7 and vapor line 9 serve to interconnect the inside unit and the outside unit. The latter may be actually outside of the dwelling, or may be located in a crawl space or basement beneath it.

The vapor line 9 is connected to one side of a conventional solenoid operated four-way valve generally designated 13 that is actuated by a thermostatic control of any conventional construction as indicated at 15. The thermostatic control may comprise a conventional thermostat located in the space to be monitored, and controlling a solenoid connected to the four-way valve as schematically indicated at 17. The four-way valve is provided with valve bodies schematically indicated at $a$ and $b$ that connect the vapor line 9 to a compressor 19 over a line 21, and connect the boiler 23, to be described, to a throttle valve V3 over a line 25 to establish a cooling cycle in the position of the valve 13 shown. In a second position of the valve 13, the line 9 is connected directly to the line 25 to establish a heating cycle.

Compressed fluid from the compressor 19 is supplied over a line 29 to a conventional condenser 31 comprising a finned coil of heat exchanger tubing 33 and an electrically operated blower indicated at 35. Liquid effluent from the condenser 31 is supplied through a check valve V4 to the liquid line 7.

The throttle valve V3 is controlled by a governor in a manner to be described to supply working fluid under pressure to a Rankine cycle engine schematically shown at 37. Exhaust fluid from the engine 37 is supplied over a line 39 to a conventional regenerator 41 where some heat is extracted and applied to the boiler input liquid, to be described.

The output exhaust fluid from the regenerator is supplied over a line 43 to the condenser 31. If desired, the liquid line 7 at the outlet of the condenser 31 may be connected to a conventional receiver 45 that essentially serves as a liquid reservoir so that for control purposes the ratio of liquid mass to vapor mass in the system can be varied. Thus, at times it may be desired to operate the condenser 31 essentially full of liquid, and at other times to operate it essentially full of gas. The reservoir receiver 45 makes such variations possible; the vapor space in the reservoir is filled with saturated vapor that condenses when the liquid level is increased, or is supplemented by evaporant when the liquid level diminishes.

The engine 37 is associated with a high pressure feed pump 47, driven by the engine, that serves to supply high pressure liquid to the boiler 23. When the engine 37 is in operation, the feed pump 47 takes liquid from the line 7 through a check valve V5 and supplies it through a check valve V6 to the regenerator 41 and thence to the boiler 23. The working fluid in the system is preferably Freon 22, or $CHClF_2$. That is a conventional, widely used refrigerant, and as an engine working fluid may be operated at 1000 p.s.i.a. and 400° F. without difficulty, providing air is excluded and it is not locally overheated.

During the heating cycle, the engine 37 is not operated, and an electric motor 49 drives a low pressure pump 51 to supply liquid to the boiler 23. Under those conditions liquid is taken from the line 7 through a check valve V7, and is supplied to the regenerator and thence to the boiler through a check valve V8. The low pressure pump 51 has an outlet pressure of approximately 300 p.s.i.a. When the feed pump 47 is not operated, this pressure of the fluid at the outlet of the check valve V8 will block the valve V6, preventing circulation of the liquid through the feed pump. On the other hand, when the feed pump is operated, there is a 100 p.s.i.a. pressure appearing at the outlet of the valve V6 that will block the valve V8, preventing circulation through the low pressure pump.

In operation, the apparatus of FIG. 1 is filled entirely with Freon in the liquid or vapor phase in the various portions of the apparatus. Air and other non-condensables are excluded. Protection against over-pressure is provided by a relief valve V9 connected to the outlet of the boiler 23.

In the position of the apparatus shown in FIG. 1, the heat exchanger 1 is operated as an evaporator for air conditioning. In this mode of operation, the low pressure pump 51 is not used, and the motor 49 is used only for starting the engine 37 in a manner to be described in more detail below. The throttle valve V3 is controlled by a governor, in a manner to be described, so that the engine will run and drive the high pressure feed pump 47 and the compressor 19. Working fluid supplied to the engine by the boiler is exhausted to the line 39, passes through the regenerator to supply heat to the incoming boiler feed liquid, and is condensed in the condenser 31.

Part of the condensate from the condenser 31 is returned to the boiler through the feed pump 47. Another portion of the liquid from the condenser 31 passes through the expansion valve V1 and is evaporated in the heat exchanger 1. Evaporated vapor in the line 9 is recompressed in the compressor 19 and returned to the condenser 31.

When the temperature falls, the thermostatic control 15 causes the four-way valve 13 to operate the elements $a$ and $b$ to their upper positions in FIG. 1, connecting the boiler output directly to the heat exchanger 1 over the line 9. The heat exchanger 1 now serves as a condenser, and supplies heat to the air in the house.

Condensed effluent from the heat exchanger 1 passes through the check valve V2 and is returned over the line 7 through the check valve V7 to the low pressure pump 51. The electric motor 49 now drives a low pressure pump, with the engine 37 not operated. Liquid from the pump 51 then passes up through the regenerator, which is ineffective with the engine 37 shut off, and then to the boiler 23 to be reboiled and passed back to the heat exchanger 1.

FIG. 2 shows the details of the fluid processing system comprising the compressor 19, engine 37, feed pump 47, motor 49 and low pressure pump 51 of FIG. 1. As shown, the apparatus is hermetically sealed in a steel container 53, which may comprise a seam welded as at 55 to complete the seal. Within the container 53, in the space generally designated 57, there is a charge of saturated Freon vapor essentially at the condenser inlet temperature and pressure.

In the base of the container 53 is a charge 59 of liquid lubricant compatible with the organic working fluid. It has been found that systems in which Freon is used as a working fluid, and in which a hydrogen-containing lubricant is used for the working parts, both the Freon and the lubricant tend to decompose, each catalyzing the decomposition of the other. Accordingly, for the working parts in the system of our invention I prefer to employ a completely fluorinated fluoroalkylether having the structural formula

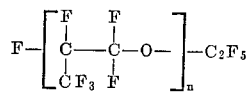

where the average value of $n$ is selected to produce a light bodied lubricating oil. Such a lubricant is available under the name Krytox from the E. I. du Pont de Nemours Corporation. As a further precaution, care should be taken in assembling the system initially to see that the working fluid is not contaminated with air and moisture.

The engine 37 and compressor 19 of FIG. 1 are combined in the apparatus of FIG. 2 and share a common crankcase 61. This crankcase 61 comprises end plates vented as indicated at 63 and 65 so that the interior shares the saturated working fluid vapor in the space 57.

The engine and compressor comprise a common shaft 67 journalled in the crankcase 61 by means of bearings 69 and 71 and connected to a single crank pin 73. To balance the assembly, a pair of counterweights 75 and 77 are connected to the crankshaft.

The engine 37 comprises two cylinders, and the compressor 19 comprises two cylinders. These cylinders are staggered about the crankcase 61 each 90° from its neighbors. One cylinder 37a of the engine is shown, and one cylinder 19a of the compresser. The other cylinders may be identical to those shown.

The engine cylinder 37a comprises a cylinder body 79 formed integrally with the crankcase 61 and having a head 81 provided with an inlet fitting connected to the line 28a from the throttle valve V3. A second supply line 28b is provided for the second engine cylinder, not shown, and the lines 28a and 28b are connected to a manifold at the outlet of the valve V3, the latter to be described.

Within each cylinder 79 of the engine 37 is a piston 83 connected to the crank pin 73 by a conventional connecting rod 85, that is preferably provided with a central passage 87 for centrifugal lubrication of the wrist pin bearing. Lubricant under pressure is provided by a centrifugal lubricant pump formed by a radial passage 91 in a projection 93 of the engine and compressor shaft 67.

The engine comprises a poppet valve 95 in the head, to be described in more detail with FIG. 3, which is knocked out of its seat by the piston 83 as the latter approaches top dead center, to admit a slug of high pressure working fluid to the space above the cylinder 83 at the start of each working cycle. The valve 95 strikes the top of the head 81 and rebounds into its seat, so that it is both sharply opened and sharply closed, to inhibit throttling.

The connecting rod 97 for the second engine cylinder is shown at the upper end of the crank pin 73, and projects upwardly in the plane of FIG. 2. The first compressor cylinder, not shown, has a connecting rod connected by means of a collar 99 to the crank pin 73. That cylinder is down in the plane of FIG. 2.

The second cylinder of the compressor, 19a, is shown as comprising a piston 101 having a connecting rod 103 rotatably connected to the crank pin 73. The inlet line 21a for the compressor cylinder 19a, and the outlet line 29a function in combination with an inlet check valve 105 and an outlet check valve 107 in a conventional manner to draw in a charge of gas under evaporator outlet pressure through the line 21 when the piston 101 is moved to the left in FIG. 2, and to expell a charge of compressed gas through the line 29 when the piston is moved to the right in FIG. 2.

FIG. 3 shows the construction of the engine portion of the engine-compressor in more detail. As shown, the head 81 for each cylinder is closed by a plug 109 formed with a lower surface 111 that serves as a stop for the poppet valve 95. The latter is guided in a cage 113 that is provided with ports at 115 to admit fluid under pressure when the valve is open.

Formed at the side of the cylinder 79 is a mounting flange 117 to which is secured an exhaust valve housing 119. This exhaust valve mechanism and its function is disclosed in more detail in copending application Ser. No. 765,043 for Exhaust Valve Mechanism For Vapor Engines, filed on the same date as the present application and assigned to the assignee of this application.

Briefly, the exhaust valve system comprises three ports, 121, 123 and 125, communicating with the cylinder 79, that are successively opened as the piston 83 moves downwardly in FIG. 3 from the top dead center position shown. The port 121 communicates with a valve body 127 that is biased to the right in FIG. 3 by means of a spring 129. With the valve 95 open, as shown in FIG. 3, the valve 127 is held in the position shown by high pressure fluid admitted above the piston. (Both the valve housing 119 and the valve 127 are shown as integral parts, but it will be obvious to those skilled in the art that in practice they would be formed of more than one part and fastened together in a conventional manner to facilitate assembly.)

In the operation of the apparatus in FIG. 3, as the piston approaches the top dead center position shown, the valve 95 is knocked up out of its seat and admits working fluid to the cylinder. At that time, the valve 127 is urged to the position shown by that fluid. As the piston 83 descends, both the port 121 and the port 123 will be uncovered. However, the valve 127 will not move at that time because it remains held in position by the high pressure fluid.

As the piston descends and the fluid expands to a lower pressure, and approximately at the time the piston begins to uncover the main exhaust port 125 leading to the exhaust line 39, the pressure above the piston will fall sufficiently to allow the spring 129 to thrust the valve 127 to the right in FIG. 3. That allows exhaust through the passage 123, around the valve body 127, through a port 131 formed in the valve body 127, and thence to a conduit 133 to the exhaust line 139. The piston 83 then falls to bottom dead center, at which time the exhaust port 125 is fully exposed and the exhaust is completed.

On the return stroke, the valve 127 remains in its open position, to the right in FIG. 3, due to the influence of the spring 129. The piston rod rises, closing the port 125, and exhaust continues through the conduit 123 until it is closed by the upper ring 135 on the piston 83. Thereafter, enough compression takes place in the fluid between the piston and the cylinder so that the valve 127 is again forced to the position shown in FIG. 3, just before the poppet valve 95 is knocked off its seat to begin the next working stroke.

Referring again to FIG. 2, an extension 137 of the motor and compressor shaft 67 serves as a drive shaft for the high pressure feed pump 47, the impeller of which is not shown. Any conventional positive displacement mechanism suitable for producing a 1000 p.s.i.a. liquid pressure in the output line 48 may be employed for this purpose, and fastened to the shaft 137. The shaft 137 passes through seals such as 139 into and out of the housing 141 for the pump 47. These seals have the highest requirements of any in the system, but they need not be perfect because a bit of leakage will not affect the operation of the system.

A further reduced extension 143 of the engine compressor shaft 67 forms, with the section 137, a ledge on which is mounted a collar 145 supporting a plurality of governing weights, here shown as a set of steel balls 147, that cooperate with a drive plate 149 to drive a lever 151 upwardly as engine speed increases. That causes a throttle valve body 153 in the throttle valve assembly V3 to be moved to the left in FIG. 2, closing the throttle to reduce the speed of the engine to the desired speed. As engine speed falls, the valve body 153 is backed off to the right in FIG. 2, causing the engine speed to be increased.

The shaft 143 is connected to one part of a one-way clutch 155 that has its other part connected to the shaft 157 of a conventional electric motor 49. The motor 49 may be of any conventional construction adapted to be reversibly actuated by alternating current. A reversing switch, not shown, and such other connections as will readily occur to those skilled in the art, are provided to permit operation of the motor in either direction.

When rotated in one direction, the motor 49 drives the clutch 155 to rotate the engine and compressor shaft 67 and thereby start that apparatus in operation. When moved in the opposite direction, the motor 49 will not drive the shaft 143, nor will it be driven by the shaft 143, because the one-way clutch 155 will slip. The shaft 157 is connected at one end to a low pressure pump impeller 159 that serves to raise the pressure of fluid applied to its inlet line 161 to approximately 300 p.s.i.a. in its output line 163. Any conventional construction may be used for that purpose.

Electrical connections to the motor 49 are made through a seal schematically indicated at 165, and conventional electrical controls and connecting parts may be mounted outside of the housing 53 in a conventional electrical box 167.

Referring next to FIG. 4, the preferred construction of the boiler 23 is shown. The purpose of the construction is to prevent local overheating of the working fluid. The apparatus shown is more fully described and shown in U.S. application for Letters Patent Ser. No. 713,647, which I filed on Mar. 18, 1968, for Engine Boiler, and which is assigned to the assignee of this application. As described in that application, an electrically operated air blower, not here shown, is associated with the inlet end of the boiler 165, and with a gas valve, to admit a combustible mixture of gases at the inlet 165 at a desired flow rate.

As explained in the above copending application, the combustible gas passes into the inlet of the boiler 165 through an intake conduit 167 to a burner generally designated 169. The burner 169 comprises a baffle 171, of sheet metal or the like, directing input gases through a surface burner element 173 that is preferably of a porous ceramic material, though it may be of a metal screen or the like, if so desired. The combustible mixture flowing through the burner element 173 is ignited at its surface, heating the outer surface of the burner element to a high temperature, so that the coils of the boiler are heated primarily by radiation and secondarily by forced convection.

The boiler coils comprise an outer coil 175, containing a thermally insensitive fluid that is preferably water, and an inner coil 25 that carries the engine and cooling-heating system working fluid. By that arrangement, local overheating of the working fluid in the line 25 is prevented. An upper heating stage is provided in the boiler 23 by a jet impingement section comprising an inverted cup-shaped sheet metal member 177 provided with perforations, as at 179, to provide heating of the upper reach of coils in the boiler by jet impingement as discussed in the above cited copending application. The exhaust gases from the upper section pass outward through an exhaust section indicated generally at 181.

While I have described the apparatus of my invention with respect to the details of a preferred embodiment thereof, many changes and variations will occur to those skilled in the art upon reading my description, and such can obviously be made without departing from the scope of my invention.

Having thus described my invention, what I claim is:

1. A temperature control system, comprising a heat exchanger adapted to be mounted in an airstream to be controlled, a fluid processing unit connected to said heat exchanger to exchange working fluid therewith, said fluid processing system comprising a boiler for providing working fluid under pressure, a vapor engine, a compressor driven by said engine, a condenser, a high pressure feed pump also driven by said engine, and an electrically operated low pressure feed pump, valve means movable between first and second positions, a first fluid circuit for the interchange of working fluid completed through said valve means in its first position for connecting said boiler to provide working fluid to said engine, said condenser and said high pressure feed pump in series, a second fluid circuit for the interchange of working fluid also completed through said valve means in its first position for connecting said heat exchanger, said compressor and said condenser in series, working fluid in said second circuit extracting heat from said airstream about said heat exchanger and a third fluid circuit completed through said valve means in its second position for connecting said boiler, said heat exchanger and said low pressure feed pump in series said low pressure heat pump being connected and supplying fluid to said boiler, said boiler providing vaporized fluid to said heat exchanger to be condensed therein and provide heat to said airstream.

2. The apparatus of claim 1, in which there is a common charge of working fluid in said system, and in which said engine, said compressor and said pumps are mounted in a sealed enclosure filled with fluid in continuity with said charge.

3. The apparatus of claim 2, in which said working fluid comprises an organic material, and in which said boiler comprises a gas-fired water jacket surrounding a heat exchanger containing said organic material for indirect heating without local hot spots.

4. The apparatus of claim 1, in which said engine, said compressor and said pumps are mounted in a sealed enclosure and in which said engine and compressor comprise a common crankcase, a crankshaft journalled for rotation in said crankcase, engine cylinders having pistons connected to drive said crankshaft, and compressor cylinders having pistons connected to be driven by said crankshaft.

5. The apparatus of claim 4, in which said electrically operated low pressure feed pump comprises an impeller, and an electric motor having a drive shaft connected to said impeller, and further comprising a one-way clutch connecting the drive shaft of said motor to said crankshaft.

6. In combination with a vapor engine having a first drive shaft and a high pressure feed pump connected to said first drive shaft, an electric motor having a second drive shaft and a low pressure pump connected to said second drive shaft, a one-way clutch interconnecting said drive shafts, conduits connecting said pumps in parallel, check valves in said conduits to isolate each pump when the other is driven, a boiler connected to said conduits to receive fluid under pressure from either pump that is driven, a first condenser, a second condenser, means connecting said condensers in parallel to said conduits to return fluid to said pumps, an exhaust line connecting said engine to said first condenser, valve means having first and second positions, a fluid circuit completed by said valve means in its first position for connecting said boiler to provide fluid to said engine, whereby said engine provides driving force to said high pressure feed pump through said first drive shaft and a fluid circuit completed by said valve means in its second position for connecting said boiler to said second condenser said electric motor driving said low pressure pump through said second drive shaft while said valve means is in said second position.

7. The apparatus of claim 6, further comprising a fluid circuit including an expansion valve and completed by said valve means in its first position for connecting said return line to said second condenser, and a fluid circuit completed by said valve means in its first position for connecting said compressor in series between said second condenser and said first condenser fluid being evaporated in said second condenser.

References Cited

UNITED STATES PATENTS

| | | | |
|---|---|---|---|
| 1,093,145 | 4/1914 | Pagel | 60—95 |
| 2,952,138 | 9/1960 | Russell et al. | 165—43 |
| 3,153,442 | 10/1964 | Silvern | 165—50 |

ROBERT A. O'LEARY, Primary Examiner

C. SUKALO, Assistant Examiner

U.S. Cl. X.R.

165—97; 62—260; 60—95